US000001015H

United States Statutory Invention Registration [19]

[11] Reg. Number: H1015

Usui et al.

[43] Published: Jan. 7, 1992

[54] METHOD OF PROCESSING A SILVER HALIDE COLOR REVERSAL PHOTOGRAPHIC LIGHT-SENSITIVE MATERIAL

[75] Inventors: Hideo Usui; Yasuo Nukunoki; Hirotsugu Kenmotsu, all of Minami-ashigara, Japan

[73] Assignee: Fuji Photo Film Co., Ltd., Minami-ashigara, Japan

[21] Appl. No.: 321,016

[22] Filed: Mar. 9, 1989

[30] Foreign Application Priority Data

Mar. 11, 1988 [JP] Japan ..... 63-56341
Jun. 16, 1988 [JP] Japan ..... 63-149159
Jun. 28, 1988 [JP] Japan ..... 63-159911

[51] Int. Cl.[5] ..... G03C 5/50; G03C 7/16
[52] U.S. Cl. ..... 430/379; 430/407; 430/409; 430/410
[58] Field of Search ..... 430/379, 407, 409, 410, 430/493

[56] References Cited

U.S. PATENT DOCUMENTS 4,774,169 9/1988 Kuse et al. ..... 430/493
4,839,262 6/1989 Schwartz ..... 430/379

*Primary Examiner*—Robert L. Stoll
*Assistant Examiner*—Joseph D. Anthony
*Attorney, Agent, or Firm*—Burns, Doane, Swecker & Mathis

[57] ABSTRACT

A method of processing a silver halide color reversal photographic light-sensitive material, in which the photographic light-sensitive material is developed, the method comprising a step of processing the photographic light-sensitive material in a reversal bath containing at least one anionic surface active agent. A method of treating a silver halide color reversal photographic light-sensitive material, in which the photographic light-sensitive material is developed, the method comprising a step of processing the photographic light-sensitive material in a reversal bath containing at least one nonionic surface active agent.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF PROCESSING A SILVER HALIDE COLOR REVERSAL PHOTOGRAPHIC LIGHT-SENSITIVE MATERIAL

BACKGROUND OF THE INVENTION

1. Field of the Invention

The present invention relates to a method of processing a silver halide color reversal photographic light-sensitive material in which an unevenness of a coloring density is minimized.

2. Description of the Prior Art

Generally, in a method of sequentially developing photographic films which are individually, vertically fixed (to be referred to as hanger-transfer type development hereinafter), photographic properties obtained at upper and lower portions of each film often slightly differ from each other. This phenomenon is derived from a slight difference between developing time periods of the upper and lower portions or a variation in amount of a developing agent on the film surface caused during conveyance. The phenomenon naturally tends to occur when a roll film is subjected to hanger-transfer type development.

The above phenomenon poses a serious problem not for a color negative film which is appreciated by only a print but for a color reversal film which is often directly appreciated. In the case of the color reversal film, a problem arises in a processing including reversal development. That is, in a processing of a color reversal photographic light-sensitive material containing a negative emulsion, as will be described below, after negative image forming black and white development and before color development, a film is irradiated with light or dipped in a reversal bath containing tin ions ($Sn^{++}$) or the like.

Black and White Development→Washing→Reversal Bath→Color Development→Rinse (Washing)→Bleaching Fixing→Washing→Stabilizing→Drying As a result of examinations, the present inventors have found that the coloring density unevenness in film upper/lower portions occurs more easily in the above processing including many steps than in a color negative treatment. Especially a density unevenness resulting from the reversal bath is a serious problem. The present inventors have made extensive studies to solve the above problem.

SUMMARY OF THE INVENTION

It is an object of the present invention to provide a method of processing a silver halide color reversal photographic light-sensitive material in which a coloring density unevenness hardly occurs.

The above object of the present invention was achieved by a method of processing a silver halide color reversal photographic light-sensitive material, in which the photographic light-sensitive material is developed, the method comprising a step of processing the photographic light-sensitive material in a reversal bath containing at least one anionic surface active agent and a method of treating a silver halide color reversal photographic light-sensitive material, in which the photographic light-sensitive material is developed, the method comprising a step of processing the photographic light-sensitive material in a reversal bath containing at least one nonionic surface active agent. As a surface active agent to be added in the reversal bath, an anionic surface active agent and a nonionic surface active agent were significantly effective.

The anionic surface active agent is defined as a surface active agent having in its molecule a sulfonic acid group and/or a carboxylic acid group as a hydrophilic group and is preferably a surface active agent represented by following formula (I), (II), (III), (IV), (V) or (VI):

Formula (I)

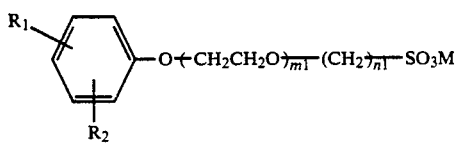

(wherein $R_1$ and $R_2$ each represent an alkyl having 1 to 18 carbon atoms, M represents a hydrogen atom or a cation, $m_1$ represents an integer of 0 to 50, and $n_1$ represents an integer of 0 to 4.)

Formula (II)

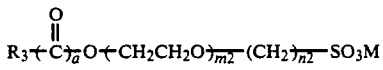

(wherein $R_3$ represents an alkyl or alkenyl having 6 to 20 carbon atoms, M represents a hydrogen atom or a cation, $m_2$ represents an integer of 0 to 52, $n_2$ represents an integer of 0 to 4, and a represents an integer of 0 or 1.)

Formula (III)

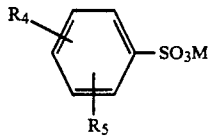

(wherein $R_4$ and $R_5$ each represent an alkyl having 6 to 18 carbon atoms and M represents a hydrogen atom or a cation.)

Formula (IV)

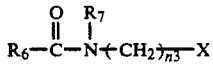

(wherein $R_6$ represents an alkyl having 6 to 20 carbon atoms, $R_7$ represents an alkyl having 1 to 4 carbon atoms, X represents —COOM or —$SO_3M$, M represents a hydrogen atom or a cation, and $n_3$ represents an integer of 1 to 4.)

Formula (V)

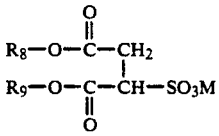

(wherein each of $R_8$ and $R_9$ each represent an having 6 to 20 carbon atoms and M represents a hydrogen atom or a cation.)

Formula (VI)

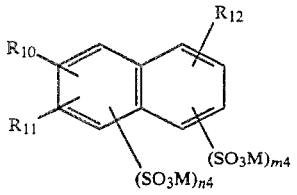

(wherein each of $R_{10}$, $R_{11}$ and $R_{12}$ each represent an alkyl having 1 to 16 carbon atoms, M represents a hydrogen atom or a cation, and each of $m_4$ and $n_4$ each represent 0, 1 or 2, $m_4$ and $n_4$ not simultaneously being 0s.)

Examples of the alkyl having 1 to 18 carbon atoms represented by $R_1$ and $R_2$ are methyl, ethyl, butyl, octyl, decyl, dodecyl and octadecyl.

Examples of the alkyl having 6 to 20 carbon atoms represented by $R_3$, $R_6$, $R_8$ and $R_9$ are hexyl, heptyl, octyl, dodecyl, octadecyl and eicocyl.

Examples of the alkyl having 6 to 18 carbon atoms represented by $R_4$ and $R_5$ are hexyl, heptyl, dodecyl, pentadecyl and octadecyl.

Examples of the alkyl having 1 to 4 carbon atoms represented by $R_7$ are methyl, ethyl, propyl and butyl.

Examples of the alkyl having 1 to 16 carbon atoms represented by $R_{10}$, $R_{11}$ and $R_{12}$ are methyl, ethyl, butyl, decyl, dodecyl and hexadecyl.

Compounds (I), (II) and (V) are most preferable compounds of those represented by formulas (I) to (VI).

Examples of the above compounds will be shown in Table 1 to be presented later.

The nonionic surface active agent is defined as a compound having in its molecule a substituted or nonsubstituted polyoxyalkylene group having 2 to 6 carbon atoms as a hydrophilic group, and a group having 4 to 30 carbon atoms as a lipophilic group, such as alkyl group, an aryl group and an aralkyl group, and is preferably a surface active agent represented by following formula (VII-1), (VII-2) or (VII-3):

Formual (VII-1)

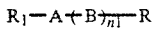

Formula (VII-2)

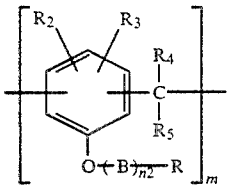

Formula (VII-3)

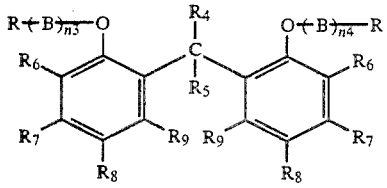

In the above formulas (VII-1 to VII-3), R represents a hydrogen atom, an alkyl having 1 to 4 carbon atoms (e.g., methyl, ethyl or hydroxyethyl), or alkylcarbonyl having 1 to 5 carbon atoms (e.g., acetyl, chloroacetyl or carboxymethylcarbonyl).

$R_1$ represents a substituted or nonsubstituted alkyl, alkenyl or aryl group having 1 to 30 carbon atoms.

A represents —O—, —S—, —COO—,

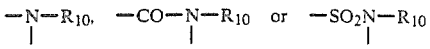

(wherein $R_{10}$ represents a hydrogen atom or a substituted or nonsubstituted alkyl). B represents an oxyalkylene group.

$R_2$, $R_3$, $R_7$ and $R_9$ each represent a hydrogen atom or a substituted or nonsubstituted alkyl, aryl, alkoxy, aryloxy, halogen atom, acyl, amido, sulfonamido, carbamoyl or sulfamoyl.

$R_6$ and $R_8$ each represent a substituted or nonsubstituted alkyl, aryl, alkoxy, aryloxy, halogen atom, acyl, amido, sulfonamido, carbamoyl or sulfamoyl. In formula (VII-3), the substituent groups on the left phenyl ring can be different from those on the right phenyl ring.

$R_4$ and $R_5$ each represent a hydrogen atom or a substituted or nonsubstituted alkyl or aryl. $R_4$ and $R_5$, $R_6$ and $R_7$, or $R_8$ and $R_9$ can be bonded with each other to form a substituted or nonsubstituted ring, respectively. $n_1$, $n_2$, $n_3$ and $n_4$ each represent an average polymerization degree of the oxyalkylene group and is a number of 2 to 50.

m represents an average polymerization degree and is a number of 2 to 50.

Preferable examples of the present invention will be described below.

B is preferably an oxyalkylene group having 2 to 6 carbon atoms, more preferably, oxyethylene, oxypropylene, oxy(hydroxy)propylene, oxybutylene or oxystyrene and, most preferably, oxyethylene.

$R_1$ is preferably alkyl, alkenyl or alkylaryl having 4 to 24 carbon atoms and, more preferably, hexyl, dodecyl, instearyl, oleyl, t-butylphenyl, 2,4-di-t-butylphenyl, 2,4-di-t-pentylphenyl, p-dodecylphenyl, m-pentadecaphenyl, t-octylphenyl, 2,4-dinonylphenyl or octylnaphthyl.

Each of $R_2$, $R_3$, $R_6$, $R_7$, $R_8$ and $R_9$ is preferably substituted or nonsubstituted alkyl having 1 to 20 carbon atoms such as methyl, ethyl, i-propyl, t-butyl, t-amyl, t-hexyl, t-octyl, nonyl, decyl, dodecyl, trichloromethyl, tribromomethyl, 1-phenylethyl or 2-phenyl-2-propyl, a substituted or nonsubstituted aryl such as a phenyl or p-chlorophenyl, a substituted or nonsubstituted alkoxy or aryloxy represented by —$OR_{11}$ (wherein $R_{11}$ represents a substituted or nonsubstituted alkyl or aryl having 1 to 20 carbon atoms, and this will be the same in the following description unless otherwise specified), a halogen atom such as a chlorine or bromine atom, an acyl represented by —$COR_{11}$, an amido represented by —$NR_{12}COR_{11}$ (wherein $R_{12}$ represents a hydrogen atom or an alkyl having 1 to 20 carbon atoms, and this will be the same in the following description unless otherwise specified), a sulfonamido represented by —$NR_{12}SO_2R_{11}$, a carbamoyl represented by

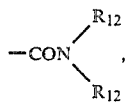

or a sulfamoyl represented by

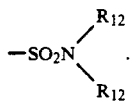

Alternatively, each of $R_2$, $R_3$, $R_7$ and $R_9$ can be a hydrogen atom. $R_6$ and $R_8$ are preferably an alkyl or a halogen atom and, more preferably, a bulky tertiary alkyl such as a t-butyl, t-amyl or t-octyl. More preferably, each of $R_7$ and $R_9$ is a hydrogen atom. That is, a compound represented by formula (VII-3) synthesized from 2,4-disubstituted phenol is more preferable.

$R_4$ and $R_5$ each represent preferably a hydrogen atom, a substituted or nonsubstituted alkyl such as methyl, ethyl, n-propyl, i-propyl, n heptyl, 1-ethylamyl, n-undecyl, trichloromethyl, or tribromomethyl, or a substituted or nonsubstituted aryl such as α-furyl, phenyl, naphthyl, p-chlorophenyl, p-methoxyphenyl, or m-nitrophenyl. $R_4$ and $R_5$ $R_6$ and $R_7$, or $R_8$ and $R_9$ can be bonded with each other to form a substituted or nonsubstituted ring such as a cyclohexyl ring. Most preferably, $R_4$ and $R_5$ each represent a hydrogen atom or an alkyl, phenyl or furyl having 1 to 8 carbon atoms. $n_1$, $n_2$, $n_3$ and $n_4$ each most preferably represent a number of 5 to 30. $n_3$ and $n_4$ can be the same or different.

These compounds are described in U.S. Pat. Nos. 2,982,651, 3,428,456, 3,457,076, 3,454,625, 3,552,972 and 3,655,337, JP-B-51-9610 ("JP-B-" means examined published Japanese patent application), JP-A-53-29715, JP-A-54-89626, ("JP-A-" means unexamined Japanese patent application), Japanese Patent Application Nos. 57-85764 and 57-90909, "Shin Kaimenkasseigai (New Surface Active Agent)" by Hiroshi Horiguchi (Sankyo Shuppan K.K., 1975), and the like.

Examples of the nonionic surface active agent suitably used in the present invention will be shown in Table 2 to be presented later.

The reversal bath of the present invention can contain a known fogging agent. Examples of the fogging agent are a tin (II) ion complex salt such as tin (II) ion organic complex phosphate (U.S. Pat. No. 3,617,282), tin (II) ion-organic complex phosphonocarboxylate (JP-B-56-32616) and tin (II) ion-complex aminopolycarboxylate (British Patent 1,209,050), and a boron compound such as a hydrogenated boron compound (U.S. Pat. No. 2,984,567) and a heterocyclic aminoborane compound (British Patent 1,011,000). The pH of this fogging bath (reversal bath) covers a wide range from acidic to alkaline sides. The pH is preferably 2 to 12, more preferably, 2.5 to 10 and, most preferably, 3 to 9.

The nonionic surface active agent does not form a salt together with a heavy metal such as $Sn_{2+}$ in a reversal processing solution and generates less precipitate, turbidity and the like. Therefore, the nonionic surface active agent is superior to the anionic one in stability of a processing solution.

In a coupler-in-emulsion type color light-sensitive material, the surface active agent is contained as an emulsifying dispersing agent for a color coupler and in order to improve a coating property. Although the surface active agent elutes and is accumulated in a processing solution while a light-sensitive material is developed, its concentration does not exceed a predetermined value because the processing solution is replenished upon a processing of a predetermined area in order to prevent a change in photographic property of the color light-sensitive material caused by exhaustion of the processing solution.

In the present invention, the anionic surface active agent can be added after a light-sensitive material is processed to a certain extent or before the processing, to achieve the same effect. Since the accumulation amount of the surface active agent eluted from a light-sensitive material is 2 to 3 mg/l or less, the surface tension is not decreased below about 35 dyn/cm. The effect of the present invention, however, becomes significant when the anionic surface active agent is added in an amount capable of decreasing the surface tension below 35 dyn/cm and is entirely different from an effect obtained by accumulation of the surface active agent in an equilibrium state during a normal processing.

In the present invention, the nonionic surface active agent can be added after a light-sensitive material is processed to a certain extent or before the processing, to achieve the same effect. The content of the nonionic surface active agent is preferably 10 mg or more and, more preferably, 15 to 200 mg per liter of the reversal processing solution. Since the accumulation amount of the surface active agent eluted from a light-sensitive material is 2 to 3 mg/l, the effect of the present invention is entirely different from that achieved by accumulation of the surface active agent in an equilibrium state during a normal processing. Although a large amount of the nonionic surface active agent can be added in a light-sensitive material, it is not practical to do so because the characteristics of the light-sensitive material is adversely affected.

In a photographic emulsion layer of the present invention any of silver bromide, silver iodobromide, silver chlorobromide, silver chloroiodobromide, silver chloride and silver chloroiodide can be used. Silver iodobromide is preferably used in a high-sensitive light-sensitive material. If silver iodobromide is to be used, the silver iodide content is typically 40 mol % or less, preferably, 20 mol % or less and more preferably, 15 mol % or less.

The above silver halide grains can be regular grains having a regular crystal form such as a cube, an octahedron or a tetradecahedron, grains having a regular crystal form such as a sphere, grains having a crystal defect such as a twinning plane or a composite form thereof. Alternatively, a mixture of grains having various crystal forms can be used.

The grains of the above silver halide can be fine grains having a grain size of about 0.1 micron or less, or large grains having a projected-area diameter of about 10 microns. In addition, an emulsion can be a monodisperse emulsion having a narrow distribution or a polydisperse emulsion having a wide distribution.

In the above emulsion layer, tabular grains having a ratio (aspect ratio) of a circle-equivalent diameter to a grain thickness of 5 or more can be used.

A crystal structure of the above emulsion grain can be uniform, can have different halogen compositions in its inner and outer portions or can be a layered structure. These emulsion grains are disclosed in British Patent 1,027,146, U.S. Pat. Nos. 3,505,068 and 4,444,877 and Japanese Patent Application No. 58-248469. In the grains, a silver halide can be bonded to a silver halide having a different composition by an epitaxial bond or bonded to a compound other than a silver halide such as silver rhodanate or lead oxide. These emulsion grains are disclosed in U.S. Pat. Nos. 4,094,684, 4,142,900 and 4,459,353, British Patent 2,038,792, U.S. Pat. Nos.

4,349,622, 4,395,478, 4,433,501, 4,463,087, 3,656,962 and 3,852,067 and JP-A-59-162540.

Although the above emulsions can be of either a surface sensitive emulsion type for forming a latent image mainly on a surface or an internally sensitive emulsion type for forming a latent image inside a grain, or an emulsion type for forming a latent image on a surface and inside again they must be negative type emulsions.

A silver halide photographic emulsion which can be used together in the present invention can be prepared by a known method, e.g., a method described in "Emulsion Preparation and Types" of *Research Disclosure,* Vol. 176, No. 17643 (December, 1978), PP. 22 to 23 or a method described in *RD,* Vol. 187, No. 18716 (November, 1979), P. 648.

A typical example of a monodisperse emulsion to be used in the present invention is an emulsion in which a mean grain size of silver halide grains is about 0.05 micron or more, grain sizes of at least 95 wt % of the grains fall within the range of ±40% of the mean grain size. An emulsion in which a mean grain size of silver halide grains is about 0.05 to 2 microns, and grain sizes of at least 95 wt % or at least 95% (number of grains) of the silver halide grains fall within the range of ±20% of the mean grain size can be used in the present invention. Methods of manufacturing such an emulsion are described in U.S. Pat. Nos. 3,574,628 and 3,655,394 and British Patent 1,413,748. In addition, mono-disperse emulsions described in JP-A-48-8600, JP-A-51-39027, JP-A-51-83097, JP-A-53-137133, JP-A-54-48521, JP-A-54-99419, JP-A-58-37635 and JP-A-58-49938 can be preferably used in the present invention.

During silver halide grain formation or physical ripening, a cadmium salt, zinc salt, lead salt, thallium salt, iridium salt or its complex salt, a rhodium salt or its complex salt, an iron salt or iron complex salt or the like can be used.

A soluble silver salt is removed from an emulsion before or after physical ripening by nudel washing, flocculation settling or ultrafiltration.

Emulsions for use in this invention are usually subjected to physical ripening and then chemical ripening and spectral sensitization. Additives which are used in such steps are described in *Research Disclosures,* RD No. 17643 (Dec. 1978) and RD No. 18716 (November 1979) and they are summarized in the following table.

Also, known photographic additives which can be used in this invention are described in the above-described two Research Disclosure publications and they are also summarized in the same table.

In the present invention, it is preferred to use various filter dyes such as yellow, magenta and cyan dyes.

| Additives | RD No. 17643 | RD No. 18716 |
|---|---|---|
| 1. Chemical sensitizers | page 23 | page 648, right column |
| 2. Sensitivity increasing agents | | page 648, right column |
| 3. Spectral sensitizers, super sensitizers | pages 23–24 | page 64B, right column to page 649, right column |
| 4. Brighteners | page 24 | |
| 5. Antifoggants, stabilizers | pages 24–25 | page 649, right column |
| 6. Light absorbent, filter dye, ultraviolet absorbents | pages 25–26 | page 649, right column to page 650, left column |
| 7. Stain preventing agents | page 25, right column | page 650, left to right columns |
| 8. Dye image stabilizers | page 25 | |
| 9. Hardening agents column | page 26 | page 651, left |
| 10. Binder | page 26 | page 651, left |
| 11. Plasticizers, lubricants | page 27 | page 650, right column |
| 12. Coating aids, surface active agents | pages 26–27 | page 650, right column |
| 13. Antistatic agents | page 27 | page 650, right column |

In this invention, various color couplers can be used. Specific examples of these couplers are described in above-described *Research Disclosure,* No. 17643, VII-C to VII-G as patent references. As dye-forming couplers, couplers giving three primary colors (i.e., yellow, magenta, and cyan) by subtraction color process by color development are typically important, and specific examples of non-diffusible couplers, four-equivalent couplers, and two-equivalent and hydrophobic couplers are described in Patents referred in above-described *Research Disclosure,* No. 17643, VII-C and VII-D and further the following couplers can be also preferably used in this invention.

Typical yellow couplers which can be used in this invention include hydrophobic acetylacetamide series couplers having a ballast group. Specific examples of the yellow coupler are described in U.S. Pat. Nos. 2,407,210, 2,875,057 and 3,265,506. In this invention, the use of two-equivalent yellow couplers is preferred. Typical examples thereof are the oxygen atom-releasing type yellow couplers described in U.S. Pat. Nos. 3,408,197, 3,447,928, 3,988,501, and 4,022,620 and the nitrogen atom-releasing type yellow couplers described in JP-B-58-10739, U.S. Pat. Nos. 4,401,752, 4,326,024, *Research Disclosure,* No. 18053 (April, 1979), British Patent 1,425,020, West German Patent Application (OLS) Nos. 2,219,917, 2,261,361, 2,329,587 and 2,433,812. Furthermore, α-pivaloylacetanilide series couplers are excellent in fastness, in particular light fastness of the colored dye. On the other hand, α-benzoylacetanilide series couplers show high coloring density.

Typical magenta couplers which can be used in this invention include hydrophobic indazolone type or cyanoacetyl series, preferably 5-pyrazolone type and pyrazoloazole series couplers each having a ballast group. The 5-pyrazolone series couplers, the 3-position of which is substituted by an arylamino or an acylamino, are preferred in the view points of the hue and coloring density of the colored dye. Specific examples of such couplers are described in U.S. Pat. Nos. 2,311,082, 2,343,703, 2,600,788, 2,908,573, 3,062,653, 3,152,896, and 3,936,015. As the releasable group of a two-equivalent 5-pyrazolone type coupler, the nitrogen atom releasing group described in U.S. Pat. No. 4,310,619 and the arylthio group described in U.S. Pat. No. 4,351,897 are particularly preferred. Also, the 5-pyrazolone type couplers having ballast group described in European Patent No. 73,636 give high coloring density. As the pyrazoloazole type magenta couplers, there are the pyrazolobenzimidazoles described in U.S. Pat. No. 3,369,879, preferably the pyrazolo[5,1-c][1,2,4] triazoles described in U.S. Pat. No. 3,725,067, the pyrazolotetrazoles described in *Research Disclosure,* RD No. 24220 (June, 1984) and JP-A-60-33552, and the pyrazolopyrazoles described in *Research Disclosure,* RD No. 24230 (June, 1984) and JP-A-60-43659. With respect to the points of showing less side yellow absorption and light fastness of the colored dye, the imidazo[1,2-b] pyrazoles described in U.S. Pat. No. 4,500,630 are preferred and the pyrazolo[1,5-b][1,2,4]triazolos described in European Patent 119,860A are particularly preferred.

Typical cyan couplers which can be used in this invention include hydrophobic and non-diffusible naphtholic and phenolic couplers. Typical examples of the cyan couplers are the naphtholic couplers described in U.S. Pat. No. 2,474,293 and preferably the oxygen atom releasing type two-equivalent naphtholic couplers described in U.S. Pat. Nos. 4,052,212, 4,146,396, 4,228,233 and 4,296,200. Also, specific examples of the phenolic couplers are described in U.S. Pat. Nos. 2,369,929, 2,801,171, 2,772,162 and 2,895,826.

Cyan couplers having fastness to humidity and temperature are preferably used in this invention and specific examples of such cyan couplers are the phenolic cyan couplers having an alkyl group of at least 2 carbon atoms at the meta-position of the phenol nucleus described in U.S. Pat. No. 3,772,002, the 2,5-diacylamino-substituted phenolic couplers described in U.S. Pat. Nos. 2,772,162, 3,758,308, 4,126,396, 4,334,011 and 4,327,173, West German Patent Application (OLS) No. 3,329,720, and European patent No. 121,365, and the phenolic couplers having a phenylureido group at the 2-position thereof and an acylamino group at the 5-position thereof described in U.S. Pat. Nos. 3,446,622, 4,333,999, 4,451,559 and 4,427,767.

A cyan coupler obtained substituting a sulfonamide group or an amide group at the 5-position of naphthol and described in European Patent No. 161,628A provides a color image which is excellent in light fastness and can be preferably used in this invention.

In this invention, the graininess can be improved by using together couplers capable of forming colored dyes having proper diffusibility. As such couplers, specific examples of magenta couplers are described in U.S. Pat. No. 4,366,237 and British Patent 2,125,570 and specific examples of yellow couplers, magenta couplers and cyan couplers are described in European Patent 96,570 and West German Patent Application (OLS) No. 3,234,533.

The dye-forming couplers and the above-described specific couplers each may form a dimer or higher polymers. Typical examples of the polymerized dye-forming couplers are described in U.S. Pat. Nos. 3,451,820 and 4,080,211. Also, specific examples of the polymerized magenta couplers are described in British Patent 2,102,173 and U.S. Pat. No. 4,367,282.

The molecular weight of the polymer coupler used in this invention is preferably 10,000 or more and, more preferably, 20,000 to 100,000.

Couplers releasing a photographically useful residue upon coupling are preferably used in this invention. DIR couplers, i.e., couplers releasing development inhibitor are described in the patents cited in above-described *Research Disclosure,* No. 17643, VII-F.

Preferred examples of these couplers which can be used in this invention are the developer inactivating type couplers described in JP-A-57-151944, the timing type couplers described in U.S. Pat. No. 4,248,962 and JP-A-57-154234, the reaction type couplers described in JP-A-60-184248. Particularly preferred examples of these couplers are the development inactivating type DIR couplers described in JP-A-57-151944, JP-A-58-217932, JP-A-60-218645, JP-A-60-225156 and JP-A-60-233650, and the reaction type DIR couplers described in JP-A-60-184248.

A redox DIR compound can be preferably used in this invention. DIR hydroquinone which can be preferably used in the present invention is described in, e.g., U.S. Pat. Nos. 336,402 and 3,379,529. Most preferable compounds are described in JP-A-50-62435, JP-A-50-133833, JP-A-50-119631, JP-A-51-51941 and JP-A-52-57828.

Couplers used in the present invention can be added in a light-sensitive material by various known dispersion methods. Typical examples of the dispersion methods are a solid dispersion method and an alkali dispersion method, preferably, a latex dispersion method and, more preferably, an oil-in-water type dispersion method. In the oil-in-water type dispersion method, couplers are dissolved in a solution of either a high-boiling point organic solvent having a boiling point of 175° C. or more or a so-called auxiliary solvent having a low boiling point or in a solution mixture of the both and then finely dispersed in an aqueous medium such as water or an aqueous gelatin solution in the presence of a surface active agent.

A light-sensitive material prepared by the present invention can contain, as a color antifoggant or color mixing preventing agent, a hydroquinone derivative, an aminophenol derivative, amines, a gallate derivative, a catechol derivative, an ascorbic acid derivative, a colorless compound forming coupler, a sulfonamidophenol derivative, and the like.

The light-sensitive material of the present invention can contain various decoloration preventing agents. Typical examples of an organic decoloration preventing agent are hindered phenols such as hydroquinones, 6-hydroxychromans, 5-hydroxycoumarans, spirochromans, p-alkoxyphenols and bisphenols, a gallate derivative, methylenedioxybenzenes, aminophenols, and hindered-amines, and an ether or ester derivative obtained by silylating or alkylating a phenolic hydroxyl group of each of the above compounds. Also, metal complexes such as a (bissalicylaldoxymato)nickel complex and a (bis-N,N-dialkyldithiocarbamato)nickel complex may be used.

In this invention, a preferable layer order is such that red-, green- and blue-sensitive layers from a support or blue-, red- and green-sensitive layers therefrom. Each emulsion layer can comprise two or more emulsion layers having different sensitivities. Alternatively, a non-light-sensitive material layer can be interposed between two or more emulsion layers having the same color sensitivity. The red-, green- and blue-sensitive layers typically contain cyan-, magenta- and yellow-forming couplers, respectively. These combinations, however, can be altered if necessary.

A light-sensitive material according to the present invention preferably has, in addition to the silver halide emulsion layers, auxiliary layers such as protective layers, interlayers, filter layers, antihalation layers, and back layers.

For the photographic light-sensitive materials of this invention, couplers imagewise releasing a nucleating agent or a development accelerator or a precursor thereof at development can be used. Specific examples of these couplers are described in British Patents 2,097,140 and 2,131,188. Also, couplers releasing a nucleating agent having an adsorptive action for silver halide are particularly preferred in this invention and specific examples thereof are described in JP-A-59-157638 and JP-A-59-170840.

Supports which can be suitably used in this invention are described in, e.g., above-described RD No. 17643, Page 28 and RD No. 18716, Page 647 (right column) to Page 648 (left column).

Although a color reversal film is typically treated as described above, a pre-bath, a prehardening bath, a neutralizing bath and the like can be used. In addition, washing after black and white development can be omitted. Also, a conditioner bleaching accelerating bath can be omitted. Furthermore, bleaching and fixing steps may be performed by a single bath of a bleach-fixing solution.

As a black-and-white developer, known black-and-white developing agents, e.g., dihydroxybenzenes such as hydroquinone, 3-pyrazolidones such as 1-phenyl-3-pyrazolidone, and aminophenols such as N-methyl-p-aminophenol can be used singly or in a combination of two or more thereof.

A color developer is an aqueous alkaline solution preferably containing an aromatic primary amine type developing agent, as a primary component. Although an aminophenol compound is effective, a p-phenylene diamine compound can be preferably used as the color developing agent. Typical examples of the p-phenylene compound are 3-methyl-4-amino-N,N-diethylaniline, 3-methyl 4-amino-N-ethyl-N-$\beta$-hydroxyethylaniline, 3-methyl-4-amino-N-ethyl-N-$\beta$-methanesulfonamidoethylaniline, and 3-methyl-4-amino-N-ethyl-N-$\beta$-methoxyethylaniline, and a sulfate, hydrochloride or p-toluenesulfonate of each of the above compounds. These diamines are generally more stable in the form of a salt than in a free state and therefore preferably used in this form.

The color developer, typically, further contain pH buffers, such as carbonates, borates, and phosphates of alkali metals, and development inhibitors or antifoggants, such as bromides, iodides, benzimidazoles and benzthiazoles. If desired, it can contain hard preservatives (e.g., hydroxylamine and sulfite), organic solvents (e.g., benzyl alcohol and diethylene glycol), development accelerators (e.g., benzil alcohol, polyethylene glycol, quaternary ammonium salts and amines), dye-forming couplers, competitive couplers, reversal agent (e.g., sodium borohydride), auxiliary developing agents (e.g., 1-phenyl-3-pyrazolidone), tackifiers, chelating agents (aminopolycarboxylic acid, aminopolyphosphonic acid, alkylphosphonic acid, phosphonocarboxylic acid, based chelating agents), and the antioxidants described in West German Patent Application (OLS) NO. 2,622,950.

As processing methods and additives for use after conditioning, methods and compounds described in Japanese Patent Application No. 61-276231, PP. 5 to 47 can be used.

DETAILED DESCRIPTION OF THE PREFERRED EMBODIMENTS

The present invention will be described in detail below by way of its examples.

EXAMPLE 1

Multilayer color light-sensitive material 101 which comprises a plurality of layers having the following compositions and formed on an undercoated triacetylcellulose film support was formed.

| | |
|---|---|
| Layer 1: Antihalation Layer: | |
| Black Colloid Silver | 0.25 g/m$^2$ |
| Ultraviolet Absorbent U-1 | 0.1 g/m$^2$ |
| Ultraviolet Absorvent U-2 | 0.1 g/m$^2$ |
| High Boiling Organic Solvent Oil-1 | 0.1 cc/m$^2$ |
| Gelatin | 1.9 g/m$^2$ |
| Layer 2: Interlayer-1: | |
| Cpd D | 10 mg/m$^2$ |
| High Boiling Organic Solvent Oil-3 | 0.04 mg/m$^2$ |
| Gelatin | 0.4 g/m$^2$ |
| Layer 3: Interlayer-2: | |
| Surface-fogged Fine Silver Iodobromide Emulsion (mean grain size: 0.06$\mu$, AgI content: 1 mol %) | silver 0.05 g/m$^2$ |
| Gelatin | 0.4 g/m$^2$ |
| Layer 4: 1st Red-sensitive Emulsion Layer: | |
| Silver Iodobromide Emulsion (a monodisperse cubic emulsion having a mean grain size of 0.2$\mu$ and an AgI content of 5 mol %) Spectrally Sensitized with Sensitizing Dyes S-1 and S-2 | silver 0.4 g/m$^2$ |
| Coupler C-1 | 0.2 g/m$^2$ |
| Coupler C-2 | 0.05 g/m$^2$ |
| High Boiling Organic Solvent Oil-2 | 0.1 cc/m$^2$ |
| Gelatin | 0.8 g/m$^2$ |
| Layer 5: 2nd Red-sensitive Emulsion Layer: | |
| Silver Iodobromide Emulsion (a monodisperse cubic emulsion having a mean grain size of 0.3$\mu$ and an AgI content of 4 mol %) Spectrally Sensitized with Sensitizing Dyes S-1 and S-2 | silver 0.4 g/m$^2$ |
| Coupler C-1 | 0.2 g/m$^2$ |
| Coupler C-3 | 0.2 g/m$^2$ |
| Coupler C-2 | 0.05 g/m$^2$ |
| High Boiling Organic Solvent Oil-2 | 0.1 cc/m$^2$ |
| Gelatin | 0.8 g/m$^2$ |
| Layer 6: 3rd Red-sensitive Emulsion Layer: | |
| Silver Iodobromide Emulsion (a monodisperse cubic emulsion having a mean grain size of 0.4$\mu$ and an AgI content of 2 mol %) Spectrally Sensitized with Sensitizing Dyes S-1 and S-2 | silver 0.4 g/m$^2$ |
| Coupler C-3 | 0.7 g/m$^2$ |
| Gelatin | 1.1 g/m$^2$ |
| Layer 7: Interlayer-3: | |
| Dye D-1 | 0.02 g/m$^2$ |
| Gelatin | 0.6 g/m$^2$ |
| Layer 8: Interlayer-4: | |
| Surface-fogged Fine Silver Iodobromide (mean grain size: 0.06$\mu$, AgI content: 1 mol %) | silver 0.05 g/m$^2$ |
| Compound Cpd A | 0.2 g/m$^2$ |
| Gelatin | 1.0 g/m$^2$ |
| Layer 9: 1st Green-sensitive Emulsion Layer: | |
| Silver Iodobromide Emulsion (a monodisperse cubic emulsion having a mean grain size of 0.2$\mu$ and an AgI content of 5 mol %) Spectrally Sensitized with Sensitizing Dyes S-3 and S-4 | silver 0.5 g/m$^2$ |
| Coupler C-4 | 0.3 g/m$^2$ |
| Compound Cpd B | 0.03 g/m$^2$ |
| Gelatin | 0.5 g/m$^2$ |
| Layer 10: 2nd Green-sensitive Emulsion Layer: | |
| Silver Iodobromide Emulsion (a monodisperse cubic emulsion having a mean grain size of 0.4$\mu$ and an AgI content of 5 mol %) Containing Sensitizing Dyes S-3 and S-4 | silver 0.4 g/m$^2$ |
| Coupler C-4 | 0.3 g/m$^2$ |
| Compound Cpd B | 0.03 g/m$^2$ |
| Gelatin | 0.6 g/m$^2$ |

-continued

| | |
|---|---|
| Layer 11: 3rd Green-sensitive Emulsion Layer: | |
| Silver Iodobromide Emulsion (a tabular emulsion having a mean grain size of 0.5μ, an aspect ratio of 5, and an AgI content of 2 mol %) Containing Sensitizing Dyes S-3 and S-4 | silver 0.5 g/m$^2$ |
| Coupler C-4 | 0.8 g/m$^2$ |
| Compound Cpd B | 0.08 g/m$^2$ |
| Gelatin | 1.0 g/m$^2$ |
| Layer 12: Interlayer-5: | |
| Dye D-2 | 0.05 g/m$^2$ |
| Gelatin | 0.6 g/m$^2$ |
| Layer 13: Yellow Filter Layer: | |
| Yellow Colloid Silver | 0.1 g/m$^2$ |
| Compound Cpd A | 0.01 g/m$^2$ |
| Gelatin | 1.1 g/m$^2$ |
| Layer 14: Interlayer-6: | |
| Gelatin | 0.4 g/m$^2$ |
| Layer 15: 1st Blue-sensitive Emulsion Layer: | |
| Silver Iodobromide Emulsion (a monodisperse cubic emulsion having a mean grain size of 0.2μ and an AgI content of 3 mol %) Containing Sensitizing Dyes S-5 and S-6 | silver 0.6 g/m$^2$ |
| Coupler C-4 | 0.6 g/m$^2$ |
| Gelatin | 0.8 g/m$^2$ |
| Layer 16: 2nd Blue-sensitive Emulsion Layer: | |
| Silver Iodobromide Emulsion (a tabular emulsion having a mean grain size of 0.5μ, an aspect ratio of 4, and an AgI content of 2 mol %) Containing Sensitizing Dyes S-5 and S-6 | silver 0.4 g/m$^2$ |
| Coupler C-5 | 0.3 g/m$^2$ |
| Coupler C-6 | 0.3 g/m$^2$ |
| Gelatin | 0.9 g/m$^2$ |
| Layer 17: 3rd Blue-sensitive Emulsion Layer: | |
| Silver Iodobromide Emulsion (a tabular emulsion having a mean grain size of 1.0μ, an aspect ratio of 4, and an AgI content of 2 mol %) Containing Sensitizing Dyes S-5 and S-6 | silver 0.4 g/m$^2$ |
| Coupler C-6 | 0.7 g/m$^2$ |
| Gelatin | 1.2 g/m$^2$ |
| Layer 18: 1st Protective Layer: | |
| Ultraviolet Absorbent U-1 | 0.04 g/m$^2$ |
| Ultraviolet Absorbent U-3 | 0.03 g/m$^2$ |
| Ultraviolet Absorbent U-4 | 0.03 g/m$^2$ |
| Ultraviolet Absorbent U-5 | 0.05 g/m$^2$ |
| Ultraviolet Absorbent U-6 | 0.05 g/m$^2$ |
| Compound Cpd C | 0.8 g/m$^2$ |
| Dye D-3 | 0.05 g/m$^2$ |
| Gelatin | 0.7 g/m$^2$ |
| Layer 19: 2nd Protective Layer: | |
| Fine Silver Iodobromide Emulsion (mean grain size: 0.06μ, AgI content: 1 mol %) | silver 0.2 g/m$^2$ |
| Yellow Colloid Silver | silver 0.01 g/m$^2$ |
| Polymethyl Methacrylate Grains (mean grain size: 1.5μ) | 0.1 g/m$^2$ |
| 4:6 Copolymer of Methyl Methacrylate and Acrylic Acid (mean grain size: 1.5μ) | 0.1 g/m$^2$ |
| Silicone Oil | 0.03 g/m$^2$ |
| Fluorine-containing Surface Active Agent W-1 | 3 mg/m$^2$ |
| Gelatin | 0.8 g/m$^2$ |

Gelatin hardening agent H-1 and a surface active agent were added to the layers in addition to the above compositions.

Sample 102 was prepared which was identical to sample 101, except for the composition of layer 19 which is specified as follows:

| | |
|---|---|
| Layer 19 (Sample 102): 2nd Protective Layer: | |
| Surface Fogged Fine Silver Iodobromide Emulsion (mean grain size: 0.06μ, AgI content: 1 mol %) | silver 0.1 g/m$^2$ |
| Polymethyl Methacrylate Grains (mean grain size: 1.5μ) | 0.1 g/m$^2$ |
| 4:6 Copolymer of Methyl Methacrylate and Acrylic Acid (mean grain size: 1.5μ) | 0.1 g/m$^2$ |
| Silicone Oil | 0.03 g/m$^2$ |
| Fluorine-containg Surface Active Agent W-1 | 3 mg/m$^2$ |
| Gelatin | 0.8 g/m$^2$ |

Formulas or names of the compounds used in the present invention will be described in Table 3 to be presented later.

Samples 101 and 102 were cut into a 60-mm wide and 90-cm long piece. The cut sample was exposed so that the color density of the red-sensitive emulsion layer (RL layer), the green-sensitive emulsion layer (GL layer) and the blue-sensitive emulsion layer (BL layer) was set to be about 0.8 respectively, and then subjected to an automatic developing machine process (process steps of development will be described below) while it was suspended from a hanger.

| Step | Time | Temperature |
|---|---|---|
| Process Steps: | | |
| 1st Development | 6 min. | 38° C. |
| Washing | 2 min. | 38° C. |
| Reversal | 2 min. | 38° C. |
| Color Development | 6 min. | 38° C. |
| Conditioning | 2 min. | 38° C. |
| Bleaching | 6 min. | 38° C. |
| Fixing | 4 min. | 38° C. |
| Washing | 4 min. | 38° C. |
| Stabilizing | 1 min. | Room Temperature |
| Drying | | |

The compounds of processing solutions were as follows.

| | |
|---|---|
| First Developer: | |
| Water | 700 ml |
| Pentasodium Nitrilo-N,N,N-trimethylenephosphonate | 2 g |
| Sodium Sulfite | 20 g |
| Hydroquinone Monosulfonate | 30 g |
| Sodium Carbonate (Monohydrate) | 30 g |
| 1-phenyl-4-methyl-4-hydroxymethyl-3-pyrazolidone | 2 g |
| Potassium Bromide | 2.5 g |
| Potassium Thiocyanate | 1.2 g |
| Potassium Iodide (0.1% solution) | 2 ml |
| Water to make | 1,000 ml |
| Reversal Solution: | |
| Water | 700 ml |
| Pentasodium Nitrilo-N,N,N-trimethylenephosphonate | 3 g |
| Stannous Chloride (Dihydrate) | 1 g |
| p-aminophenol | 0.1 g |
| Sodium Hydroxide | 8 g |
| Glacial Acetic Acid | 15 ml |
| Water to make | 1,000 ml |
| Color Developer: | |
| Water | 700 ml |
| Pentasodium Nitrilo-N,N,N-trimethylenephosphonate | 3 g |
| Sodium Sulfite | 7 g |

-continued

| | |
|---|---|
| Sodium Tritiary Phosphate (Dodecahydrate) | 36 g |
| Potassium Bromide | 1 g |
| Potassium Iodide (0.1% solution) | 90 ml |
| Sodium Hydroxide | 3 g |
| Citrazinic Acid | 1.5 g |
| N-ethyl-N-(β-methanesulfonamidoethyl)-3-methyl-4-aminoaniline Sulfate | 11 g |
| 3,6-dithiaoctane-1,8-diol | 1 g |
| Water to make | 1,000 ml |
| Conditioning Solution: | |
| Water | 700 ml |
| Sodium Sulfite | 12 g |
| Sodium Ethylenediaminetetraacetate (Dihydrate) | 8 g |
| Thioglycerin | 0.4 ml |
| Glacial Acetic Acid | 3 ml |
| Water to make | 1,000 ml |
| Bleaching Solution: | |
| Water | 800 ml |
| Sodium ethylenediaminetetraacetate (Dihydrate) | 2 g |
| Ammonium Iron (III) Ethylenediaminetetraacetate (Dihydrate) | 120 g |
| Potassium Bromide | 100 g |
| Water to make | 1,000 ml |
| Fixing Solution: | |
| Water | 800 ml |
| Ammonium Thiosulfate | 80.0 g |
| Sodium Sulfite | 5.0 g |
| Sodium Bisulfite | 5.0 g |
| Water to make | 1,000 ml |
| Stabilization Solution: | |
| Water | 800 ml |
| Formalin (37 wt %) | 5.0 ml |
| Fuji Drywell (surface active agent available from Fuji Photo Film Co., Ltd.) | 5.0 ml |
| Water to make | 1,000 ml |

The development process usinq a commercially available kit described above was considered as Process No. 1.

Following the same procedures as in Process No. 1, sample 101 was cut into a 6-cm wide and 90-cm long piece, uniformly exposed so that the coloring density of each of the red-, green- and blue-sensitive emulsion layers was set to be about 0.8, and subjected to an automatic development process while it was suspended from a hanger, except that in the reversal bath, a surface active agent was added as shown in Table 4 in addition to the above standard solution. In order to enhance a density unevenness, stirring of the color development bath was started delayed by 30 seconds.

TABLE 4

| Process No. | Processing Solution |
|---|---|
| 1 | Standard Solution |
| 2 | Solution added with 10 mg/l of compound a-15 |
| 3 | Solution added with 50 mg/l of compound a-15 |
| 4 | Solution added with 50 mg/l of compound a-14 |
| 5 | Solution added with 50 mg/l of compound a-16 |
| 6 | Solution added with 100 mg/l of compound a-18 |
| 7 | Solution added with 100 mg/l of compound a-19 |
| 8 | Solution added with 100 mg/l of compound a-20 |
| 9 | Solution added with 100 mg/l of compound b-1 |
| 10 | Solution added with 100 mg/l of compound b-2 |
| 11 | Solution added with 100 mg/l of compound b-3 |
| 12 | Solution added with 100 mg/l of compound b-4 |
| 13 | Solution added with 100 mg/l of compound b-5 |
| 14 | Solution added with 100 mg/l of compound b-9 |
| 15 | Solution added with 100 mg/l of compound b-10 |
| 16 | Solution added with 100 mg/l of compound b-13 |
| 17 | Solution added with 50 mg/l of compound b-14 |
| 18 | Solution added with 100 mg/l of compound b-14 |
| 19 | Solution added with 100 mg/l of compound b-15 |
| 20 | Solution added with 100 mg/l of compound b-16 |
| 21 | Solution added with 100 mg/l of compound b-19 |
| 22 | Solution added with 100 mg/l of compound b-26 |

The density at the central portion located 10 cm away from the upper end of the developed film and the density at the central portion located 10 cm away from the lower end thereof were measured. The difference between the two densities was considered as a vertical density difference.

In addition, densities at a portion located 30 cm away from the lower end were horizontally, continuously measured. A difference (i.e., an unevenness) of the density value from the average of the continuously measured density was obtained. The results are shown in Table 5.

TABLE 5

| Process | Vertical Density Difference | | | Horizontal Density Difference | | | Sample Subjected to | |
|---|---|---|---|---|---|---|---|---|
| No. | B | G | R | B | G | R | Processing | Remarks |
| 1 | 0.15 | 0.15 | 0.15 | 0.04 | 0.01 | 0.01 | Sample 101 | Comparative Example |
| 2 | 0.10 | 0.10 | 0.10 | 0.01 | 0.00 | 0.00 | " | Present Invention |
| 3 | 0.08 | 0.08 | 0.08 | 0.00 | 0.00 | 0.00 | " | " |
| 4 | 0.11 | 0.11 | 0.11 | 0.00 | 0.00 | 0.00 | " | " |
| 5 | 0.10 | 0.10 | 0.10 | 0.01 | 0.00 | 0.00 | " | " |
| 6 | 0.11 | 0.11 | 0.11 | 0.01 | 0.00 | 0.00 | " | " |
| 7 | 0.10 | 0.10 | 0.10 | 0.00 | 0.00 | 0.00 | " | " |
| 8 | 0.09 | 0.09 | 0.09 | 0.00 | 0.00 | 0.00 | " | " |
| 1 | 0.15 | 0.15 | 0.15 | 0.04 | 0.01 | 0.01 | Sample 102 | Comparative Example |
| 9 | 0.08 | 0.08 | 0.08 | 0.01 | 0.00 | 0.00 | " | Present Invention |
| 10 | 0.10 | 0.09 | 0.09 | 0.00 | 0.00 | 0.00 | " | " |
| 11 | 0.09 | 0.09 | 0.09 | 0.00 | 0.00 | 0.00 | " | " |
| 12 | 0.08 | 0.08 | 0.09 | 0.00 | 0.00 | 0.00 | " | " |
| 13 | 0.09 | 0.09 | 0.09 | 0.00 | 0.00 | 0.00 | " | " |
| 14 | 0.08 | 0.08 | 0.08 | 0.00 | 0.00 | 0.00 | " | " |
| 15 | 0.10 | 0.09 | 0.09 | 0.00 | 0.00 | 0.00 | " | " |
| 16 | 0.09 | 0.08 | 0.08 | 0.01 | 0.00 | 0.00 | " | " |
| 17 | 0.09 | 0.09 | 0.09 | 0.00 | 0.00 | 0.00 | " | " |
| 18 | 0.08 | 0.08 | 0.08 | 0.00 | 0.00 | 0.00 | " | " |
| 19 | 0.08 | 0.08 | 0.08 | 0.00 | 0.00 | 0.00 | " | " |
| 20 | 0.09 | 0.08 | 0.08 | 0.00 | 0.00 | 0.00 | " | " |
| 21 | 0.09 | 0.09 | 0.09 | 0.01 | 0.00 | 0.00 | " | " |

TABLE 5-continued

| Process No. | Vertical Density Difference B | G | R | Horizontal Density Difference B | G | R | Sample Subjected to Processing | Remarks |
|---|---|---|---|---|---|---|---|---|
| 22 | 0.09 | 0.09 | 0.09 | 0.01 | 0.00 | 0.00 | " | " |

The density difference along either the vertical or horizontal direction was smaller, and therefore a better image without a density unevenness was obtained in the sample processed with the processing solution added with the surface active agent than in the sample processed with the commercially available kit.

EXAMPLE 2

Multilayer color light-sensitive material 201 which comprises a plurality of layers having the following compositions and formed on an undercoated triacetylcellulose film support was formed.

| | | |
|---|---|---|
| Layer 1: Antihalation Layer: | | |
| Black Colloid Silver | | 0.25 g/m$^2$ |
| Ultraviolet Absorbent U-1 | | 0.1 g/m$^2$ |
| Ultraviolet Absorbent U-2 | | 0.1 g/m$^2$ |
| High Boiling Organic Solvent Oil-1 | | 0.1 cc/m$^2$ |
| Gelatin | | 1.9 g/m$^2$ |
| Layer 2: Interlayer-1: | | |
| Gelatin | | 0.4 g/m$^2$ |
| Layer 3: | | |
| 1st Red-sensitive Emulsion Layer: | | |
| Silver Iodobromide Emulsion (a monodisperse cubic emulsion having a mean grain size of 0.2μ and an AgI content of 5 mol %) Spectrally Sensitized with Sensitizing Dyes S-1 and S-2 | silver | 0.4 g/m$^2$ |
| Surface-fogged Fine Silver Iodobromide Emulsion (mean grain size: 0.06μ, AgI content: 1 mol %) | silver | 0.02 g/m$^2$ |
| Coupler C-1 | | 0.2 g/m$^2$ |
| Coupler C-2 | | 0.05 g/m$^2$ |
| High Boiling Organic Solvent Oil-2 | | 0.1 cc/m$^2$ |
| Gelatin | | 0.8 g/m$^2$ |
| Layer 4: | | |
| 2nd Red-sensitive Emulsion Layer: | | |
| Silver Iodobromide Emulsion (a monodisperse cubic emulsion having a mean grain size of 0.3μ and an AgI content of 4 mol %) Spectrally Sensitized with Sensitizing Dyes S-1 and S-2 | silver | 0.4 g/m$^2$ |
| Coupler C-1 | | 0.2 g/m$^2$ |
| Coupler C-3 | | 0.2 g/m$^2$ |
| Coupler C-2 | | 0.05 g/m$^2$ |
| High Boiling Organic Solvent Oil-1 | | 0.1 cc/m$^2$ |
| Gelatin | | 0.8 g/m$^2$ |
| Layer 5: | | |
| 3rd Red-sensitive Emulsion Layer: | | |
| Silver Iodobromide Emulsion (a monodisperse cubic emulsion having a mean grain size of 0.4μ and an AgI content of 2 mol %) Spectrally Sensitized with Sensitizing Dyes S-1 and S-2 | silver | 0.4 g/m$^2$ |
| Coupler C-3 | | 0.7 g/m$^2$ |
| Gelatin | | 1.1 g/m$^2$ |
| Layer 6: Interlayer-2: | | |
| Compound Cpd A | | 0.2 g/m$^2$ |
| Gelatin | | 1.0 g/m$^2$ |
| Layer 7: | | |
| 1st Green-sensitive Emulsion Layer: | | |
| Silver Iodobromide Emulsion (a monodisperse cubic emulsion having a mean grain size of 0.2μ and an AgI content of 5 mol %) Spectrally Sensitized with Sensitizing Dyes S-3 and S-4 | silver | 0.5 g/m$^2$ |
| Surface-fogged Fine Silver Iodobromide (mean grain size: 0.06μ, AgI content: 1 mol %) | silver | 0.02 g/m$^2$ |
| Coupler C-4 | | 0.3 g/m$^2$ |
| Compound Cpd B | | 0.03 g/m$^2$ |
| Gelatin | | 0.5 g/m$^2$ |
| Layer 8: | | |
| 2nd Green-sensitive Emulsion Layer: | | |
| Silver Iodobromide Emulsion (a monodisperse cubic emulsion having a mean grain size of 0.4 and an AgI content of 5 mol %) Containing Sensitizing Dyes S-3 and S-4 | silver | 0.4 g/m$^2$ |
| Coupler C-4 | | 0.3 g/m$^2$ |
| Compound Cpd B | | 0.03 g/m$^2$ |
| Gelatin | | 0.6 g/m$^2$ |
| Layer 9: | | |
| 3rd Green-sensitive Emulsion Layer: | | |
| Silver Iodobromide Emulsion (a tabular emulsion having a mean grain size of 0.5μ, an aspect ratio of 5, and an AgI content of 2 mol %) Containing Sensitizing Dyes S-3 and S-4 | silver | 0.5 g/m$^2$ |
| Coupler C-4 | | 0.8 g/m$^2$ |
| Compound Cpd B | | 0.08 g/m$^2$ |
| Gelatin | | 1.0 g/m$^2$ |
| Layer 10: Interlayer-3: | | |
| Dye D-2 | | 0.05 g/m$^2$ |
| Gelatin | | 0.6 g/m$^2$ |
| Layer 11: Yellow Filter Layer: | | |
| Yellow Colloid Silver | | 0.1 g/m$^2$ |
| Compound Cpd A | | 0.01 g/m$^2$ |
| Gelatin | | 1.1 g/m$^2$ |
| Layer 12: | | |
| 1st Blue-sensitive Emulsion Layer: | | |
| Silver Iodobromide Emulsion (a monodisperse cubic emulsion having a mean grain size of 0.2 and an AgI content of 3 mol %) Containing Sensitizing Dyes S-5 and S-6 | silver | 0.6 g/m$^2$ |
| Coupler C-4 | | 0.6 g/m$^2$ |
| Gelatin | | 0.8 g/m$^2$ |
| Layer 13: | | |
| 2nd Blue-sensitive Emulsion Layer: | | |
| Silver Iodobromide Emulsion (a tabular emulsion having a mean grain size of 0.5μ, an aspect ratio of 4, and an AgI content of 2 mol %) Containing Sensitizing Dyes S-5 and S-6 | silver | 0.4 g/m$^2$ |
| Coupler C-5 | | 0.3 g/m$^2$ |
| Coupler C-6 | | 0.3 g/m$^2$ |
| Gelatin | | 0.9 g/m$^2$ |
| Layer 14: | | |
| 3rd Blue-sensitive Emulsion Layer: | | |
| Silver Iodobromide Emulsion (a tabular emulsion having a mean grain size of 1.0μ, an aspect ratio of 4, and an AgI content of 2 mol %) Containing Sensitizing Dyes S-5 and S-6 | silver | 0.4 g/m$^2$ |
| Coupler C-6 | | 0.7 g/m$^2$ |
| Gelatin | | 1.2 g/m$^2$ |
| Layer 15: 1st Protective Layer: | | |
| Ultraviolet Absorvent U-1 | | 0.04 g/m$^2$ |
| Ultraviolet Absorvent U-3 | | 0.03 g/m$^2$ |
| Ultraviolet Absorvent U-4 | | 0.03 g/m$^2$ |
| Ultraviolet Absorvent U-5 | | 0.05 g/m$^2$ |
| Ultraviolet Absorvent U-6 | | 0.05 g/m$^2$ |
| Compound Cpd C | | 0.8 g/m$^2$ |
| D-3 | | 0.05 g/m$^2$ |

-continued

| | | |
|---|---|---|
| Gelatin | | 0.7 g/m$^2$ |
| Layer 16: 2nd Protective Layer: | | |
| Fine Silver Iodobromide Emulsion (mean grain size: 0.06μ, AgI content: 1 mol %) | silver | 0.2 g/m$^2$ |
| Yellow Colloid Silver | silver | 0.01 g/m$^2$ |
| Polymethyl Methacrylate Grains (mean grain size: 1.5μ) | | 0.1 g/m$^2$ |
| 4:6 Copolymer of Methyl Methacrylate and Acrylic Acid (mean grain size: 1.5μ) | | 0.1 g/m$^2$ |
| Silicone Oil | | 0.03 g/m$^2$ |
| Fluorine-containing Surface Active Agent W-1 | | 3 mg/m$^2$ |
| Gelatin | | 0.8 g/m$^2$ |

Gelatin hardening agent H-1 and a surface active agent were added to the layers in addition to the above compositions.

Formulas or names of the compounds used in the present invention will be shown in Table 3.

Following the same procedure as in Example 1, sample 201 was cut, exposed, and then developed using a processing solution similar to that used in Example 1, thereby measuring densities. The results are shown in Table 6.

TABLE 6

| Process No. | Vertical Density Difference B | G | R | Horizontal Density Difference B | G | R | Remarks |
|---|---|---|---|---|---|---|---|
| 1 | 0.16 | 0.16 | 0.16 | 0.03 | 0.01 | 0.01 | Comparative Example |
| 2 | 0.11 | 0.11 | 0.11 | 0.01 | 0.00 | 0.00 | Present Invention |
| 3 | 0.08 | 0.09 | 0.09 | 0.00 | 0.01 | 0.00 | Present Invention |
| 4 | 0.08 | 0.08 | 0.08 | 0.00 | 0.00 | 0.00 | Present Invention |
| 5 | 0.09 | 0.09 | 0.09 | 0.00 | 0.00 | 0.00 | Present Invention |
| 6 | 0.08 | 0.08 | 0.08 | 0.00 | 0.00 | 0.01 | Present Invention |
| 7 | 0.09 | 0.09 | 0.09 | 0.00 | 0.00 | 0.00 | Present Invention |
| 8 | 0.08 | 0.08 | 0.08 | 0.01 | 0.00 | 0.00 | Present Invention |
| 9 | 0.10 | 0.10 | 0.09 | 0.01 | 0.00 | 0.00 | Present Invention |
| 10 | 0.09 | 0.09 | 0.09 | 0.00 | 0.00 | 0.00 | Present Invention |
| 11 | 0.09 | 0.08 | 0.08 | 0.00 | 0.00 | 0.00 | Present Invention |
| 12 | 0.10 | 0.11 | 0.11 | 0.01 | 0.00 | 0.00 | Present Invention |
| 13 | 0.08 | 0.08 | 0.08 | 0.00 | 0.00 | 0.00 | Present Invention |
| 14 | 0.09 | 0.09 | 0.09 | 0.01 | 0.00 | 0.00 | Present Invention |
| 15 | 0.08 | 0.08 | 0.08 | 0.00 | 0.00 | 0.00 | Present Invention |
| 16 | 0.10 | 0.10 | 0.10 | 0.00 | 0.00 | 0.00 | Present Invention |
| 17 | 0.09 | 0.10 | 0.10 | 0.01 | 0.00 | 0.00 | Present Invention |
| 18 | 0.09 | 0.09 | 0.09 | 0.01 | 0.00 | 0.00 | Present Invention |
| 19 | 0.09 | 0.09 | 0.09 | 0.00 | 0.00 | 0.00 | Present Invention |
| 20 | 0.08 | 0.09 | 0.09 | 0.00 | 0.00 | 0.00 | Present Invention |
| 21 | 0.10 | 0.11 | 0.10 | 0.01 | 0.00 | 0.00 | Present Invention |
| 22 | 0.08 | 0.08 | 0.08 | 0.01 | 0.00 | 0.00 | Present Invention |

The density difference along either the vertical or horizontal direction was smaller and therefore a better image without a density unevenness was obtained in the sample processed with the processing solution added with the surface active agent than in the sample processed by the commercially available kit.

TABLE 1 a-1 $C_9H_{19}$—(C6H4)—$O(CH_2CH_2O)_{15}SO_3Na$ a-2 $C_9H_{19}$—(C6H4)—$O(CH_2CH_2O)_4(CH_2)_3SO_3Na$

TABLE 1-continued a-3 $C_{12}H_{25}$—(C6H4)—$O(CH_2CH_2O)_6(CH_2)_3SO_3K$ a-4 $C_{12}H_{25}O(CH_2CH_2O)_4(CH_2)_3SO_3K$ a-5 $C_{16}H_{33}O(CH_2CH_2O)_6(CH_2)_4SO_3Na$ a-6 $C_{12}H_{25}OSO_3Na$ a-7 $C_{12}H_{25}O(CH_2CH_2O)_6SO_3Na$ a-8 $C_{11}H_{23}C(=O)O(CH_2CH_2O)_6SO_3Na$ a-9 $C_{13}H_{27}C(=O)O(CH_2CH_2O)_6(CH_2)_3SO_3Na$ a-10 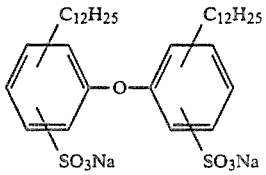

a-11 $C_{12}H_{25}C(=O)N(CH_3)CH_2CH_2COOH$ a-12 $C_9H_{19}O(C=O)CH_2$ / $C_9H_{19}O(C=O)CH(SO_3Na)$ a-13 $C_5H_{11}OCOCH(SO_3Na)$ / $C_{10}H_{21}OCOCH_2$ a-14 $C_4H_9CH(C_2H_5)CH_2OCOCH(SO_3Na)$ / $C_4H_9CH(C_2H_5)CH_2OCOCH_2$ a-15 $C_8H_{17}OOC—CH_2$ / $C_8H_{17}OOC—CH(SO_3Na)$ a-16 $C_6H_{13}OOCCH_2$ / $C_6H_{13}OOCCH(SO_3Na)$ a-17 $C_{10}H_{21}OOC—CH_2$ / $C_{10}H_{21}OOC—CH(SO_3Na)$ a-18 $C_{12}H_{25}$—(C6H4)—$SO_3Na$ a-19 $C_{10}H_{21}$—(C6H4)—$SO_3Na$ a-20 $C_8H_{17}$—(C6H4)—$SO_3Na$

TABLE 1-continued
a-21 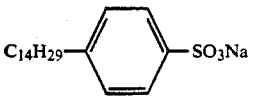
TABLE 1-continued
a-22 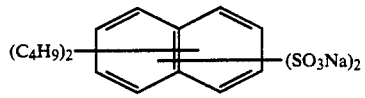
a-23 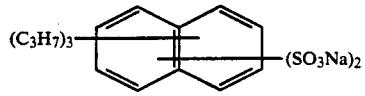
TABLE 2
b-1 $C_{11}H_{23}COO(CH_2CH_2O)_8H$
b-2 $C_{15}H_{31}COO(CH_2CH_2O)_{15}H$
b-3 $C_{17}H_{33}COO(CH_2CH_2O)_5(CH_2-CH(OH)-CH_2O)_3(CH_2CH_2O)_5H$
b-4 $C_8H_{17}O(CH_2CH_2O)_7H$
b-5 $C_{12}H_{25}O(CH_2CH_2O)_{10}H$
b-6 $C_{16}H_{33}O(CH_2CH_2O)_{12}H$
b-7 $C_{18}H_{35}O(CH_2CH(OH)CH_2O)_2(CH_2CH_2O)_{10}H$
b-8 $C_{22}H_{45}O(CH_2CH_2O)_{25}H$
b-9 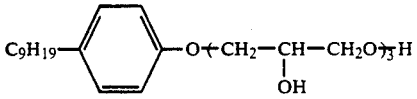
b-10 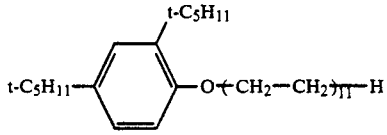
b-11 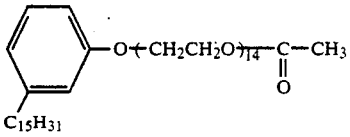
b-12 $C_{16}H_{33}O(CH_2CH_2O)_4(CH_2CH(OH)CH_2O)_2(CH_2CH_2O)_4H$
b-13 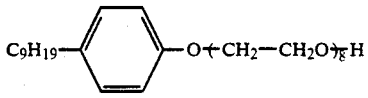
b-14 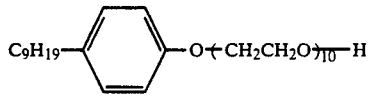
b-15 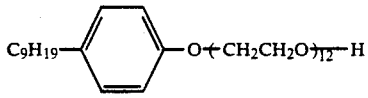
b-16 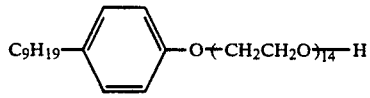
b-17 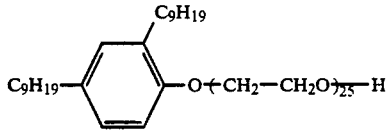
b-18 $C_{13}H_{27}CON(CH_2CH_2O)_aH(CH_2CH_2O)_bH$, $a + b = 15$
b-19 $C_{13}H_{27}CON(CH_3)(CH_2-CH_2O)_{12}H$
b-20 $C_{12}H_{25}N(CH_2CH_2O)_aH(CH_2CH_2O)_bH$, $a + b = 20$
b-21 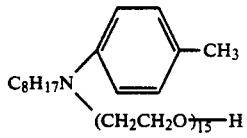
b-22 $C_{12}H_{25}S(CH_2CH_2O)_{16}H$ TABLE 2-continued
b-23 $C_{12}H_{25}O\text{-}(CH(CH_3)CH_2O)_3\text{-}(CH_2CH_2O)_{15}\text{-}H$
b-24 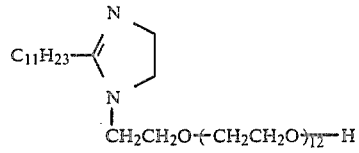
b-25 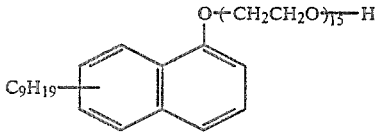
b-26 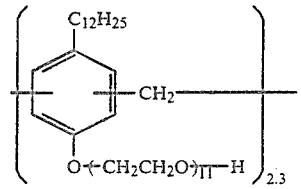
b-27 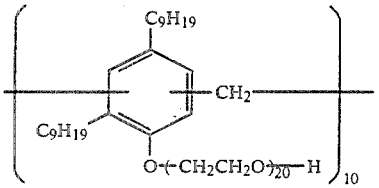
b-28 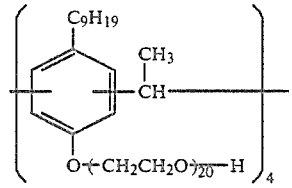
b-29 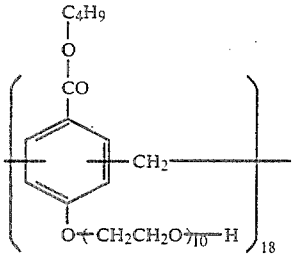
b-30 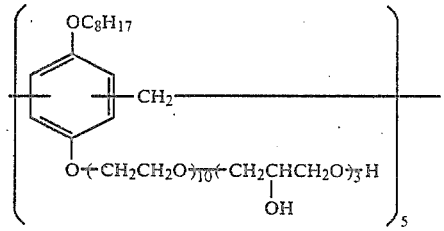
b-31 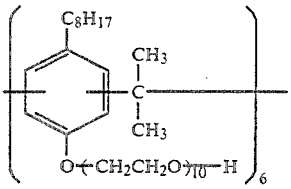
b-32 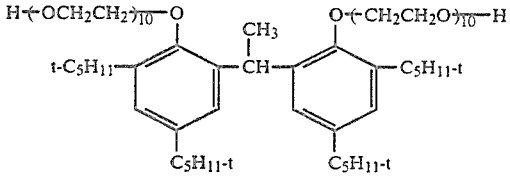
b-33 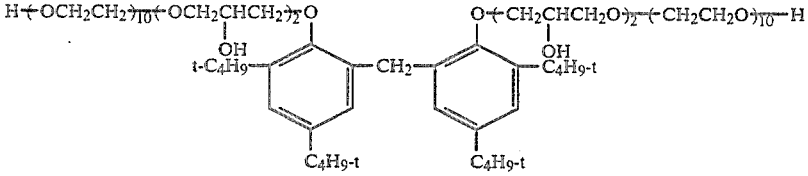
b-34 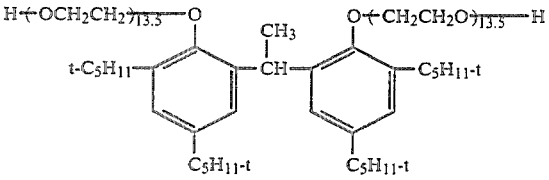

TABLE 2-continued
b-35 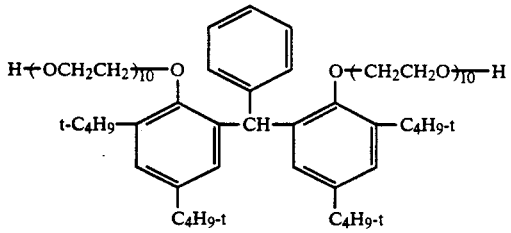
b-36 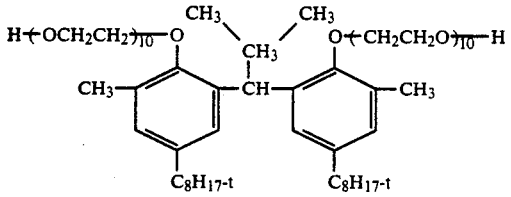
b-37 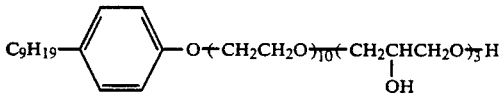
b-38 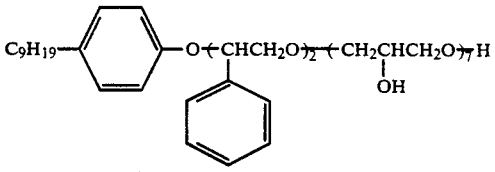
b-39 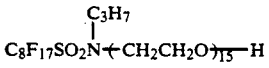
b-40 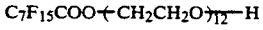
b-41 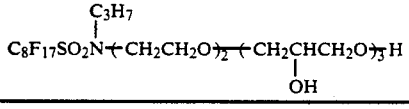
TABLE 3
C-1
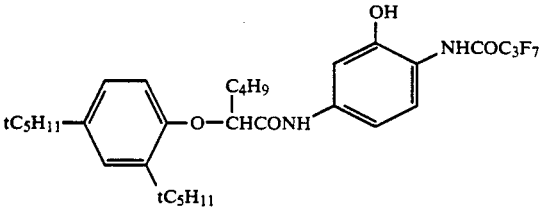
C-2
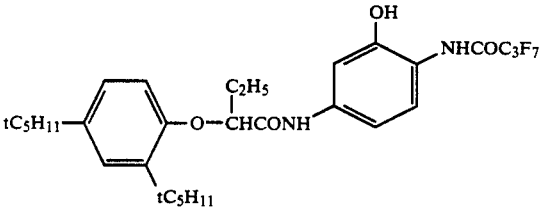
C-3
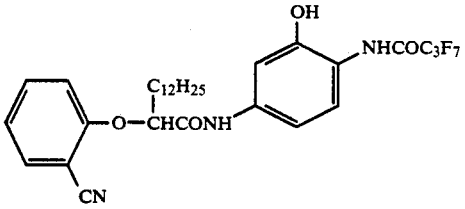
C-4
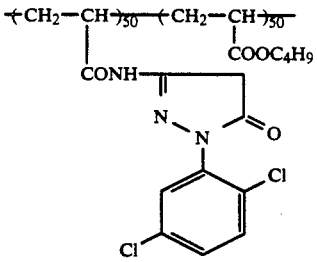

TABLE 3-continued
C-5
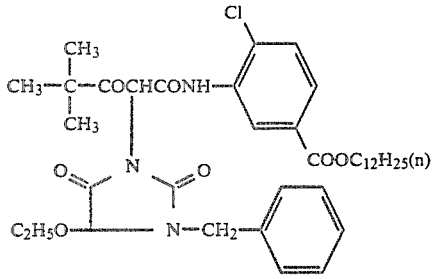
C-6
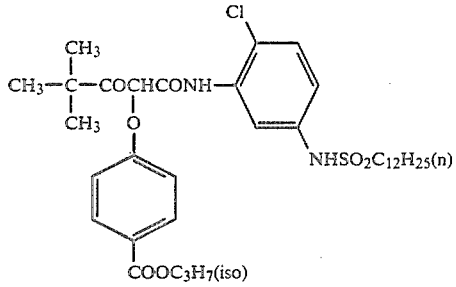
S-1
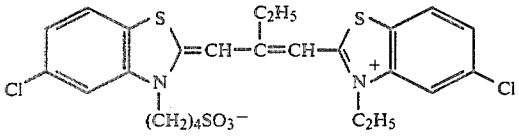
S-2
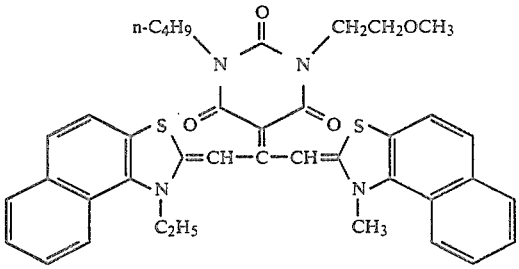
S-3
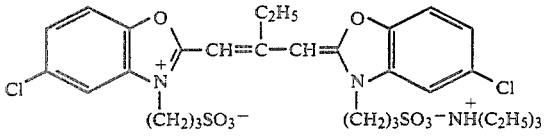
S-4
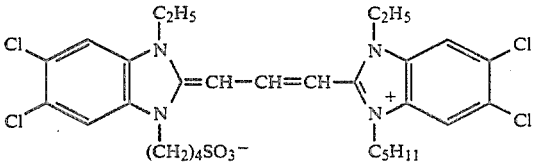
S-5
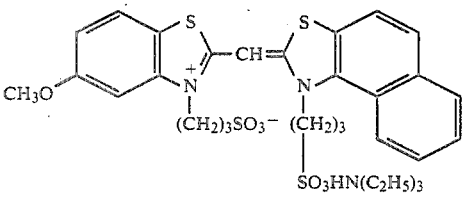
S-6
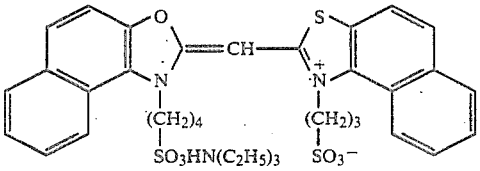
dibutyl phthalate Oil-1
tricresye phosphate Oil-2
Oil-3
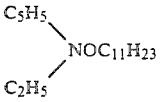
Cpd A
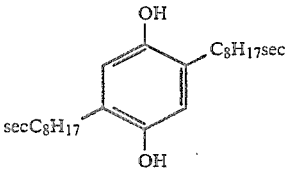
Cpd B
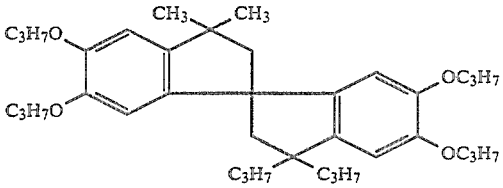
Cpd C
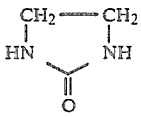
Cpd D
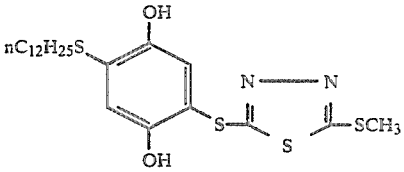
U-1
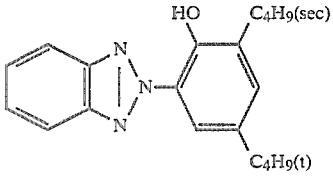
U-2
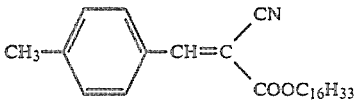

TABLE 3-continued

U-3

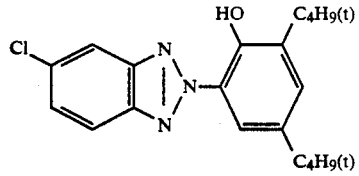

U-4

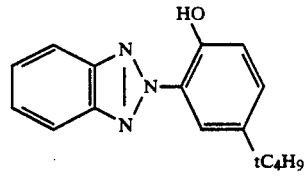

U-5

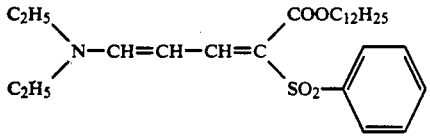

U-6

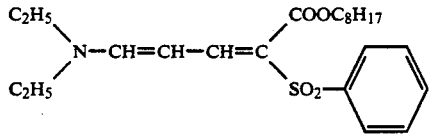

D-1

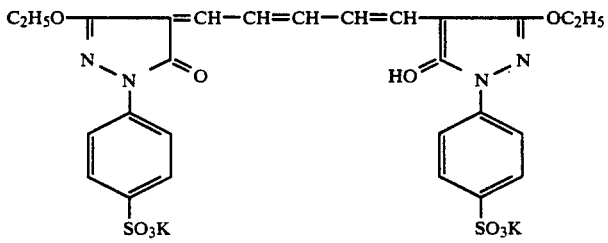

D-2

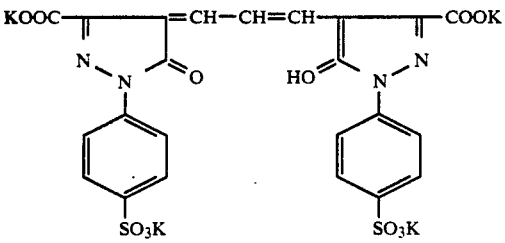

D-3

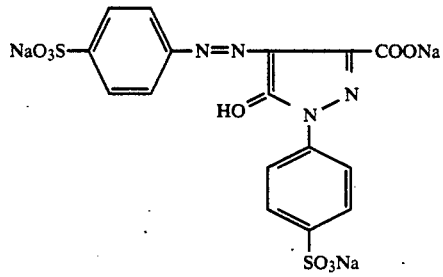

H-1

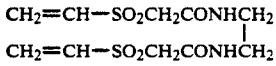

W-1

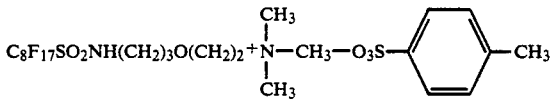

What is claimed is:

1. A method of processing a silver halide color reversal photographic light-sensitive material containing a negative emulsion, in which the photographic light-sensitive material is developed, said method comprising a step of processing the photographic light-sensitive material in a reversal bath in between a black and white development bath and a color development bath containing at least one anionic surface active agent.

2. A method of treating a silver halide color reversal photographic light-sensitive material containing a negative emulsion, in which the photographic light-sensitive material is developed, said method comprising a step of processing the photographic light-sensitive material in a reversal bath in between a black and white development bath and a color development bath containing at least one nonionic surface active agent.

3. The method of claim 1 wherein the anionic surface active agent is present in an amount sufficient to decrease the surface tension below 35 dyne/cm.

4. The method according to claim 2 wherein the nonionic surface active agent is present in an amount of at least 10 mg/l of the reversal bath.

* * * * *